United States Patent [19]

Swain

[11] 4,241,412
[45] Dec. 23, 1980

[54] POLAR TO CARTESIAN MAPPING APPARATUS AND METHOD

[75] Inventor: Allan L. Swain, Whitmore, Calif.
[73] Assignee: Diasonics, Inc., Sunnyvale, Calif.
[21] Appl. No.: 21,230
[22] Filed: Mar. 16, 1979
[51] Int. Cl.³ .......................... G06F 5/00; G01S 7/44
[52] U.S. Cl. .................................. 364/731; 343/5 SC
[58] Field of Search .............. 364/731, 815; 343/5 SC

[56] References Cited

U.S. PATENT DOCUMENTS

| 3,816,736 | 6/1974 | Krohn ................................. 364/815 |
| 4,002,827 | 1/1977 | Nevin et al. ....................... 343/5 SC |
| 4,106,021 | 8/1978 | Katagi ............................ 364/731 X |
| 4,128,838 | 12/1978 | Branda et al. ..................... 343/5 SC |
| 4,164,739 | 8/1979 | Katagi .............................. 343/5 SC |

Primary Examiner—David H. Malzahn
Attorney, Agent, or Firm—Blakely, Sokoloff, Taylor & Zafman

[57] ABSTRACT

An apparatus and method for mapping data associated with spacial polar angles into a Cartesian coordinate system is disclosed. In the described application, ultrasound returns from a rotating transducer are mapped into a memory to permit presentation on a raster scanned display. A tangent function is used to compute X and Y locations in a digital differential analyzer. The selection of data for these locations is controlled with a secant function by a second digital differential analyzer to minimize quantizing errors.

19 Claims, 9 Drawing Figures

Fig. 1

$X_1 = Y_1 \tan \theta$

LATERAL BEAM PROCESSING

Fig. 9

POLAR TO CARTESIAN MAPPING APPARATUS AND METHOD

BACKGROUND OF THE INVENTION

1. Field of the Invention

The invention relates to apparatuses and methods for converting information from a polar coordinate system into a Cartesian coordinate system.

2. Prior Art

In many fields, such as radar and ultrasound, sensing of parameters occurs at a plurality of polar angles. In some applications it is desirable to present the sensed information in a Cartesian form since the information is more meaningful when laid out in orthogonal coordinates. This is particularly true where an orthogonal transform is used to interpret the information such as a Fourier transform. In other cases, a Cartesian coordinate system is preferred since it may be readily displayed on commonly available raster scanned displays. Numerous apparatuses and methods are known for converting polar coordinate data into Cartesian coordinate data. Some of these systems are extremely complicated and require too many computations to provide a practical real-time display. Other systems provide distorted and non-uniform displays.

As will be seen, the present invention provides an even, undistorted display with a relatively simple apparatus. The tangent and secant functions are employed for coordinate conversion and data selection.

SUMMARY OF THE INVENTION

An apparatus and method are described for mapping data associated with a plurality of polar angles into a Cartesian coordinate system having a first and a second axis. The data is mapped in a form suitable for presentation on a raster scanned display. Trigonometric function means are employed to provide signals representative of both the tangent function and secant function of the polar angles. A first differential means provides locations long the first and second axes as a function of the tangent signal. A second differential means is used to control the selection of data for each of the locations on the first and second axes as a function of the secant signal. In this manner, both X and Y locations are determined for data at each of the angles along with the appropriate data to be stored or displayed for each location.

DETAILED DESCRIPTION OF THE INVENTION

An apparatus and method for mapping data associated with polar angles into a Cartesian coordinate system is described. In the following description, frequent reference is made to the mapping of returns from an ultrasound transducer, since this is the field in which the presently preferred embodiment of the invention is realized. It will be apparent to one skilled in the art that the apparatus and method of the present invention may be employed in other fields. In the following description, numerous specific details, such as specific word lengths, memory capacities, etc., are set forth to provide a thorough understanding of the present invention. However, it will be obvious to one skilled in the art that these specific details are not required to practice the invention. In other instances, well-known circuits have been set forth in block diagram form in order not to obscure the present invention in unnecessary detail.

Figures 6, 7:
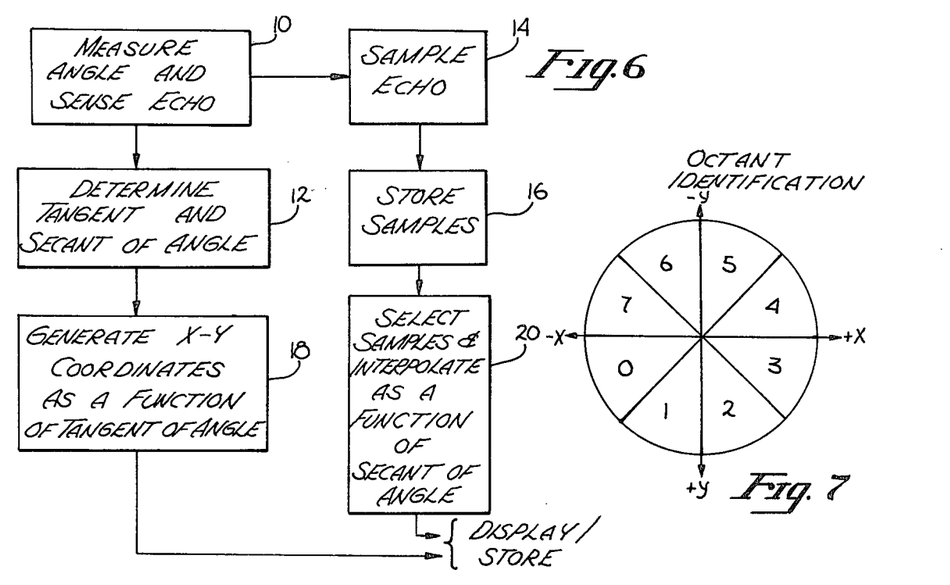
FIG. 6 is a block diagram describing the method of the present invention.
FIG. 7 is a diagram used to establish octant identification for purposes of explanation.

Referring first to FIG. 6, the method for mapping the data from polar form into Cartesian form is best illustrated. As indicated by block 10, the data is sensed at a plurality of known polar angles. This data, for the presently preferred embodiment, consists of ultrasound returns or echoes. The tangent and secant of each of the angles at which the data is sensed is determined as indicated by block 12. The tangent of the angle is used in computing the X-Y coordinates for the data (block 18). The apparatus for determining the X and Y coordinates is shown in FIG. 1.

Figures 2, 3:
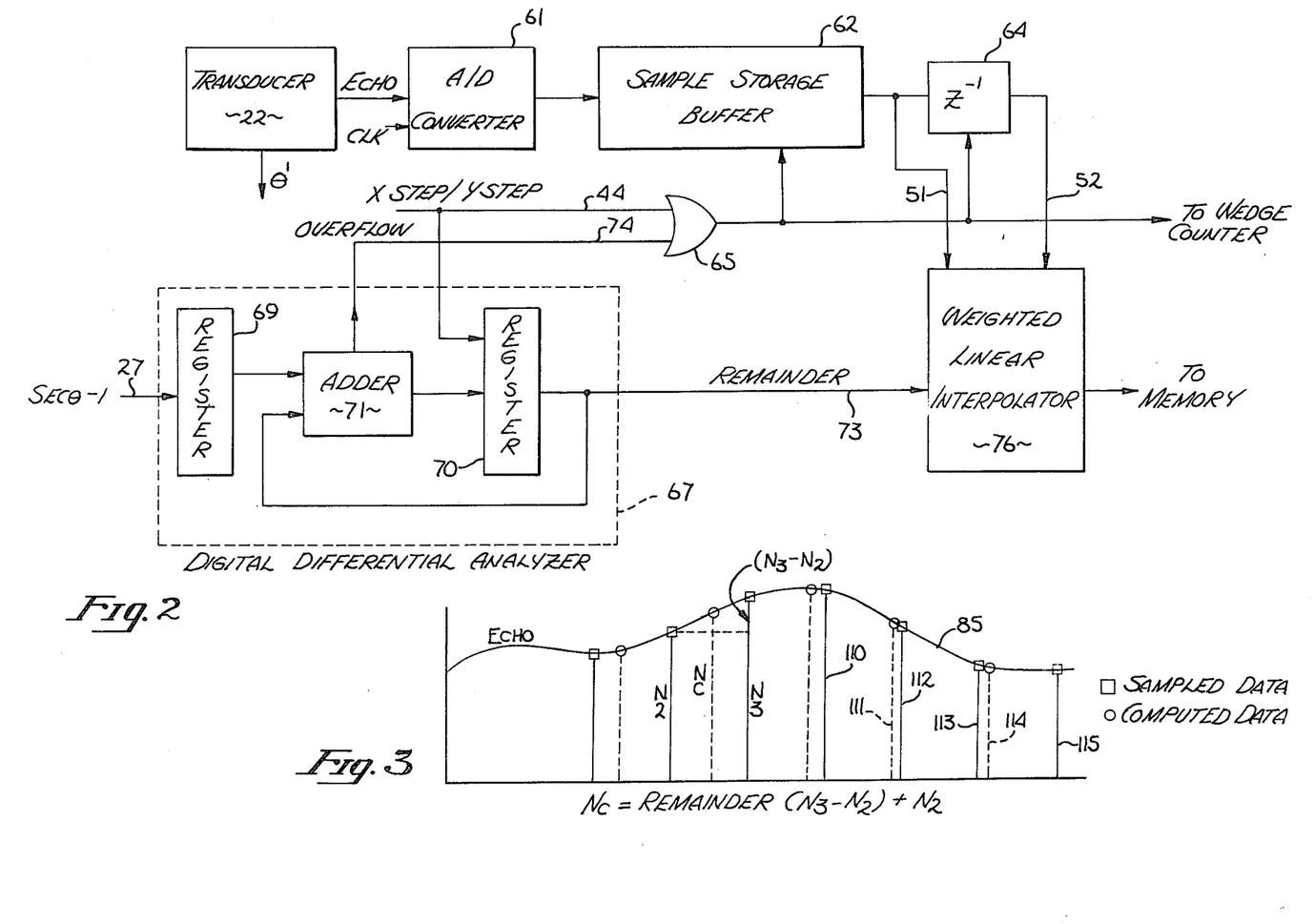
FIG. 2 is a block diagram of the presently preferred embodiment of the circuit for selecting and processing data samples for each of the X and Y locations employing the secant function.
FIG. 3 is a graph used to illustrate the operation of the circuit of FIG. 2.

The data, in the presently preferred embodiment, for each angle is sampled at a plurality of equal time intervals (block 14). Each sample is then temporarily stored, as indicated by block 16. The samples are then selected as a function of the secant of the angle. (Instead of this selection, the sample rate may be varied as (1/sec $\theta$) or cos $\theta$; however, this is more difficult to implement.) A data sample is selected for each of the X-Y locations in memory. The use of the secant function in this manner greatly reduces the distortion that would otherwise occur from mapping the inherently circular data onto orthogonal coordinates using tangent alone. Moreover, a linear interpolation is employed to further reduce distortion. The apparatus for performing the methods set forth in blocks 14, 16 and 20 is shown in FIG. 2.

Figure 1:
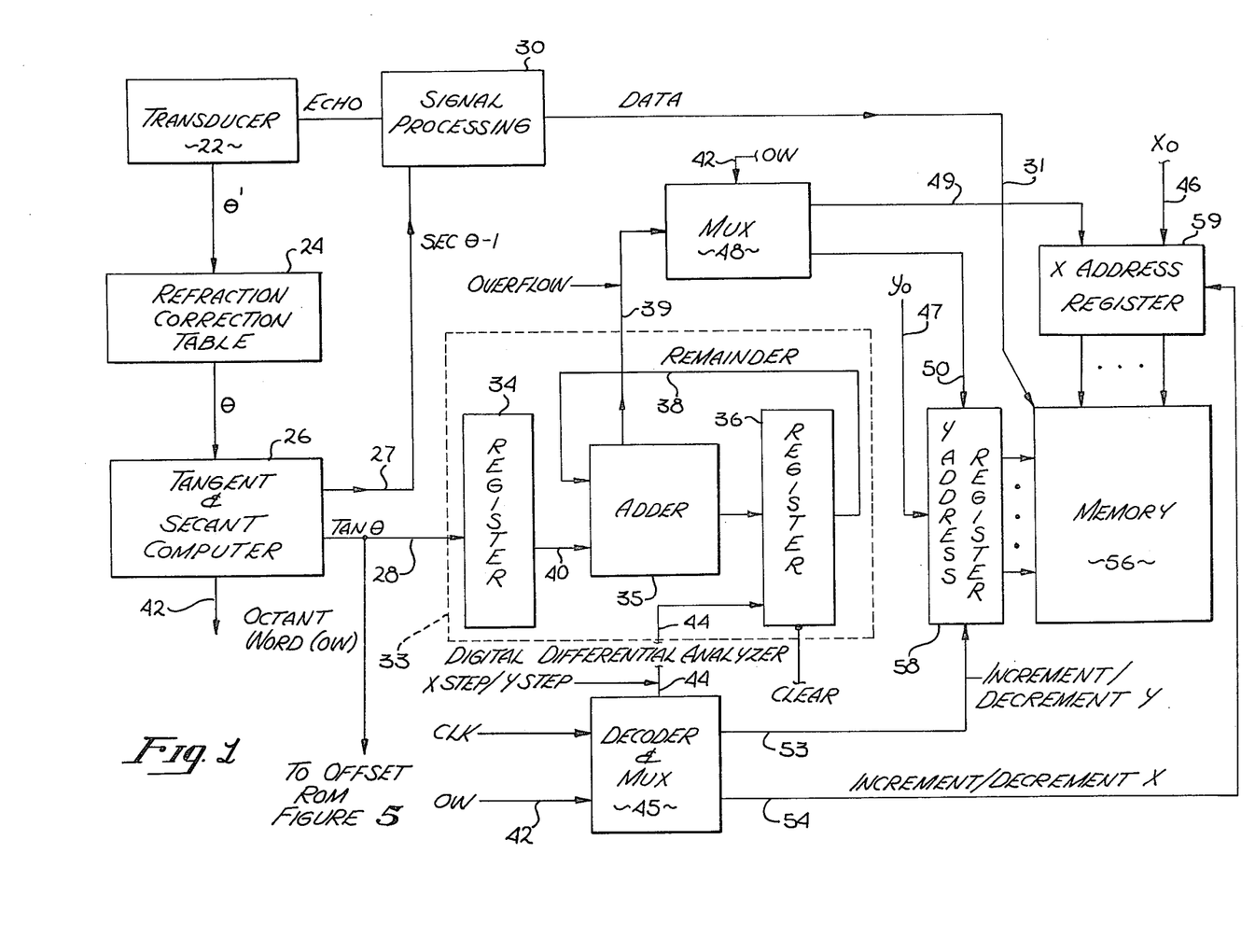
FIG. 1 is a block diagram of the presently preferred embodiment of the circuit for determining the X and Y locations for the data employing the tangent function.

In FIG. 1, ultrasound returns are sensed by the transducer 22. In the presently preferred embodiment, this transducer includes a plurality of rotating ultrasound transducers which are sequentially activated. An optical encoder, which is driven with the transducers, provides angle information in digital form. A complete description of this transducer is set forth in copending application Ser. No. 925,701, filed July 18, 1978, entitled "ULTRASOUND IMAGING APPARATUS", and assigned to the assignee of this application. Numerous other transducers, antennas, or the like may be employed in lieu of the transducer described in this copending application.

The echoes or returns sensed by the transducer 22 are coupled to a signal processing means 30. Those portions of the signal processing means which are the subject of this invention are described in detail in conjunction with FIGS. 2 and 9. The output data from the signal processing means 30 is coupled to a random-access memory (RAM) 56. The remainder of the circuitry of FIG. 1 provides addresses for the RAM 56 to assure that the data is stored in proper locations. In the presently preferred embodiment, memory 56 is a $512 \times 512 \times 6$ memory. 6-bit words are used to define the intensity at each pixel when the stored data is read for display on a raster scanned cathode ray tube. As presently implemented, the system uses 8-bit data words which are compressed by known logarithmic compression means before storage as 6-bit words.

The digital words representing each of the angles are coupled to a refraction correction table 24, as indicated by the angle $\theta'$ in FIG. 1. As described in the above-referenced copending application, the ultrasound is refracted at the interface of the transducer assembly and the body tissue. A corrected angle is provided for each angle $\theta'$ by the refraction correction table 24. Thus, table 24 may be an ordinary look-up table implemented in a read-only memory (ROM) or the corrected angle may be computed. The corrected angle $\theta$ is communicated to the tangent and secant computer 26.

The tangent and secant computer 26 is used to compute tangent and secant values for each of the angles communicated to computer 26. The tangent value is coupled to the register 34 on line 28 and the value of (sec $\theta - 1$) is communicated to the signal processing means 30 on line 27. Note that when the term secant or the like is employed in this application it is intended to also include (sec $\theta - 1$) which is sometimes referred to as exsecant. The tangent and secant values may be obtained from a look-up table, again employing a ROM, or may be computed with well-known algorithms.

Referring briefly to FIG. 7, in the presently preferred embodiment, the angles through which the transducer rotates are divided into octants identified as octants 0 through 7, in FIG. 7. This convention was adopted since it allows the use of angles no larger than 45° with an octant number. With this convention, the values of tan $\theta$ and (sec $\theta - 1$) never exceed unity. The computer 26, in its currently preferred embodiment, provides two 16-bit words, one coupled to line 27 and the other to line 28 to provide the exsecant and tangent values, respectively, and a 3-bit word on line 42, identified as the octant word (OW) which indicates the current octant.

Figure 4:
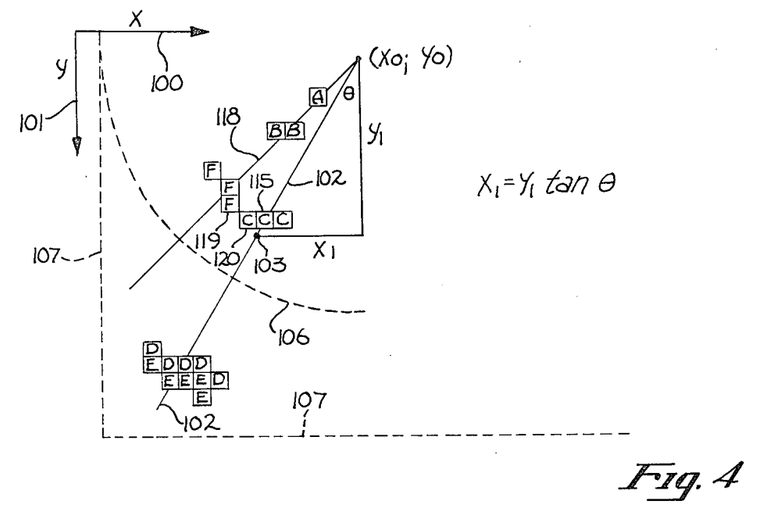
FIG. 4 is a graph used to illustrate the operation of the circuits of FIGS. 1, 2 and 5.

Before describing the remainder of the circuitry shown in FIG. 1, reference is made briefly to FIG. 4. Assume in FIG. 4 that the X and Y axes of a display, or locations in the RAM 56, are represented by the axes 100 and 101, respectively. Further assume that the line 102 represents an instantaneous position of the transducer at the angle $\theta$. At this position, a plurality of returns will be received by the transducer, which requires storage in the memory. For example, the return from point 103 with reference to the starting position $X_0$, $Y_0$ should be stored at the position $X_1$, $Y_1$. The relationship between $X_1$ and $Y_1$ is $X_1 = Y_1 \tan \theta$. When the returns from the transducer, at each angle, are correctly stored in the memory, the memory then can be read and the data readily displayed on a raster scanned display.

In general, the circuit of FIG. 1 steps the Y address register 58 and then computes the appropriate X location. In some octants, such as octants 0 and 3, the X address register is stepped and the Y location computed, employing the relationship $X = Y \tan \theta$.

A digital differential analyzer shown within dotted line 33 of FIG. 1 computes the X and Y locations. This analyzer includes a digital register 34 which is coupled to receive the tangent value on line 28. This register is coupled by line 40 to provide one input to an adder 35. The output of the adder 35 is coupled to a register 36. The output of register 36, line 38, provides the other input to the adder 35. The adder 35 overflows and provides a signal on line 39 each time the total (sum) within the adder reaches or exceeds the value 1. Each time the register 36 is clocked by the signal on line 44, its contents are communicated to the adder 35 and are added to the value stored within the register 34. The sum is then communicated to register 36. If the sum is greater than or equal to one, an overflow occurs and the register 36 receives the remainder. The registers 34 and 36 and adder 35 may be ordinary digital means.

Figure 8:
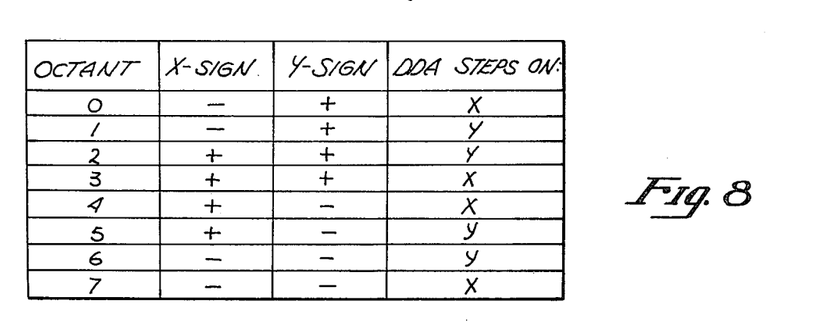
FIG. 8 is a table used to correlate octants with the X and Y signs in the octants and other information, as will be described.

A decoder and multiplexer 45 receives a clocking signal and the 3-bit octant word (OW) on line 42. The clocking signal corresponds to the times at which samples are taken of the ultrasound return at each of the angles. (Note that because of the relatively slow rate of rotation of the transducer, when compared to the time required to receive ultrasound returns, it is assumed that the returns for a given pulse are received at the same angle. However, the trigonometric values are stored and delayed with delays corresponding to the delay introduced by buffers 62a, 62b and 62c, as will be better understood in conjunction with FIG. 9.) The decoder and multiplexer 45 determines whether the X or Y register is to be incremented or decremented and, in effect, provides the X-step or Y-step signals for implementing $X = Y \tan \theta$ and $Y = X \tan \theta$. Referring briefly to FIG. 8, for each of the octants 0 through 7, the X sign/Y sign and whether the digital differential analyzer is stepped on the X or Y counts is set forth in table form. The decoder and multiplexer 45 implements the table of FIG. 8. By way of example, assume that the transducer is in the second octant. As indicated, the X sign is plus, the Y sign is plus and the DDA steps on the Y counts. Thus, for each clock pulse, the Y address register 58 is stepped by one count in the positive sense by a signal applied on line 53. The Y register counts also in a positive sense, however only when receiving a signal from the DDA, as will be described. Signals corresponding to the Y steps are communicated on line 44 and used to clock the DDA. If, on the other hand, the transducer is in octant 4, register 59 would be incremented for each clocking signal and register 58 would be decremented by the computed values of $y = x \tan \theta$.

The overflow from the adder 35 is communicated to a multiplexer 48 which directs this signal to either the Y register 58 or X register 59. This signal steps, that is, adds 1, to the contents of the register receiving the signal. The octant word on line 42 determines which of the registers will receive the signal. For example, for octant 1, the X register receives the signal while for octant 3 the Y register receives the signal (FIG. 8). Ordinary, well-known circuits may be employed for the multiplexers 45 and 48.

The X register 59 and Y register 58, as mentioned, provide the addresses for the memory 56. The incrementing and decrementing of these registers is controlled by signals on lines 53 and 54, also the registers are stepped by signals supplied on lines 49 and 50. As these registers select a position in the memory, the data from the signal processing means 30 is stored at the selected location. As will be described in conjunction with FIG. 5, in some cases a single word from the signal processing means 30 is stored in a number of locations.

Referring to FIG. 4, the starting point for the line 102 is $X_0$, $Y_0$. A number of variables control the starting point for each of the polar lines, such as line 102. For example, where a plurality of transducers are employed and sequentially activated as in the presently preferred embodiment, a different starting origin is used for each of the spaced-apart transducers. If a transducer is moved linearly, a starting point is determined by the position of the transducer. A starting position for each angle is communicated to the X address register 59 on line 46 (FIG. 1) and to the Y address register 58 on line 47. In the presently preferred embodiment, the values $X_0$ and $Y_0$ are, to some extent, manually adjusted by the operator to provide positioning changes and field size changes. In some applications, for example where the transducer is rotating about a single point, update values for $X_0$ and $Y_0$ as a function of angle are not needed.

Assume for purposes of explanation that the angle communicated to the computer 26 is 26° 34' and that the octant word indicates octant 1. The signal communicated by the computer to the register 34 for this condition is 0.5 (tan 26° 34'=0.5). Assume further that a value for $X_0$ and $Y_0$ has been communicated to the registers 59 and 58, respectively, and that the register 36 has been cleared. For these initial conditions, the starting address is $X_0$ and $Y_0$; the remainder is equal to 0 and no overflow signal is present on line 39. When the decoder and multiplexer 45 is clocked, the Y address register 58 is incremented by a signal on line 53. The value in register 34 is added to the remainder, and thus register 36 contains the value of 0.5; however, no overflow occurs. At this time, the new address is $Y_0+1$ and $X_0$. When the next clock pulse occurs, the remainder of 0.5 from register 36 is added to the contents of register 34, producing a 1.0. This causes an overflow on line 39; the X register 59 decrements and simultaneously the Y register is incremented, bringing the new address to $Y_0+2$, $X_0-1$. When the next clock pulse occurs, the remainder of 0 is added to 0.5, thus no overflow occurs; however, the Y register is again incremented. The next address is then $Y_0+3$, $X_0-1$. This addressing continues for each of the clocking pulses associated with the angle of 26° 34'.

Thus, in the above-described manner, for each angle the data from the signal processing means 30 is stored at correct locations within the memory 56. The digital differential analyzer provides (in an incremental form) the results of $x=y \tan \theta$, or $y=x \tan \theta$ to assure the addressing of the correct memory locations.

If only the tangent function is employed for the mapping of the polar data, lines will be plotted at the correct angles but the data content of those lines will be distorted, since returns at the same radius are plotted on a square format rather than on an arc. Briefly referring to FIG. 4, by way of example, all the returns along line 106 would be plotted along the lines 107 with the above-described memory addressing means. The secant function is employed in the circuit of FIG. 2 to correctly plot data along each polar line.

Referring to FIG. 2, the transducer 22 is again shown with the sensed returns coupled to an analog-to-digital converter 61. This converter, which is clocked by the clocking signal, samples the returns at a plurality of equal times at each angle and for each sample provides an 8-bit digital word to the sample storage buffer 62. In the presently preferred embodiment, 768 samples are stored in buffer 62 for each angle. Since these samples are taken at equal time intervals, they represent echoes at equal distances in space. The secant function through the digital differential analyzer 67 controls the rate of selection of the samples stored within the buffer 62 so as to prevent the above-described distortion.

The DDA 67 is somewhat similar to the DDA 33 of FIG. 1 and includes a register 69 which receives the secant function, specifically sec $\theta-1$, on line 27. The output of register 69 is coupled to an adder 71. The other input to the adder 71 is the remainder from the register 70. The adder 71 overflows each time its contents reach or exceed the value 1 and this overflow is coupled to one input terminal of the OR gate 65 on line 74. The remainder or output of the register 70 is also employed for interpolation purposes, as will be described later, and is coupled to the weighted linear interpolator 76 via line 73. This value is also coupled to the input of adder 71. The other input terminal to the OR gate 65 receives the X-step/Y-step signal on line 44. This signal is also coupled to the register 70 for clocking this register in the same manner as the signal was used to clock the register 36 of FIG. 1.

Examining first the input to the OR gate 65 on line 44, each time an X-step or Y-step occurs, an output from the OR gate 65 causes an 8-bit word to be read from the buffer 65. (Note that the samples are removed from the buffer on a first in-first out basis.) Thus, without the input on line 74, the samples would be simply read from the buffer 62 and stored within the memory 56 of FIG. 1, one after the other, thereby causing the distortion described in conjunction with FIG. 4. The input to the OR gate on line 74 causes samples to be read from the buffer 62 at an increased rate as the angle $\theta$ increases to compensate for this effect.

Referring to the DDA 67, it operates in a similar manner to the DDA 33 of FIG. 1. The sec $\theta-1$ value stored in register 69 is added on each clock cycle to the remainder value communicated from register 70. The sum from the adder 71 less the overflow (if one occurs) is then placed into the register 70. When an overflow occurs, an additional output signal occurs from gate 65 which causes an additional word to be read from the buffer 65. Note that for angles between 0° and 45°, sec $\theta-1$ varies from 0 to 0.4142. For angles close to 0°, infrequent overflows occur and the rate at which words are removed from the buffer 62 is substantially controlled by the signal on line 44. As the angles become larger, more overflows occur, and the rate at which the words are removed from the buffer 62 increases. Thus, for the larger angles of $\theta$, more samples are required than at the smaller angles of $\theta$.

To further correct for quantizing errors in the position of data samples, the interpolator 76 uses the remainder stored within the register 70 to interpolate between adjacent samples. As the sample words leave the buffer 62, they are communicated to the interpolator 76 on line 51; they are also communicated to the buffer 64 which provides a delay equivalent to one time interval, as determined by the output of the gate 65. The output of the buffer 64 is communicated to interpolator 76 on line 52.

The operation of the interpoler 76 may be best understood with reference to FIG. 3. An echo or return is shown by the continuous waveform 85. The evenly spaced sample data points obtained by the analog-todigital converter 65 are shown by the squares along the waveform. Assume the value represented by the line $N_2$ is communicated to interpolator 76 on line 51 and that the sample $N_3$ is communicated to interpolator 76 on line 52. Furthermore, assume that the remainder stored within register 70 is approximately equal to 0.5. The interpolator calculates a value $N_C$ by, in effect, subtracting $N_2$ from $N_3$ and multiplying the difference by the magnitude of the remainder. This product is then added to $N_2$. The resultant value or "resample" is shown by the amplitude $N_C$ in FIG. 3 along with an equation representing $N_C$. In practice, the actual equation implemented by the circuitry is $$N_C = (N_3 \times \text{Remainder}) + [N_2 \times (1-\text{Remainder})]$$

Thus, the remainder is used to move the value of the computed data either closer to $N_2$ or $N_3$ as a function of the values stored in register 70. The interpolator is fabricated from ordinary digital multipliers, adders, subtracters and buffers. While in the presently preferred embodiment a linear interpolation is employed, other interpolation schemes which better approximate a predictable waveform may be employed.

In FIG. 3, as mentioned, the sampled data points are shown along the waveform 85 by the squares and the computed data points by the circles. Since the squares and circles are not overlapping, it is apparent that $\theta \neq 0$, and thus the spacing between the computed data points is greater than the spacing between the sample data points. The value of the computed data at amplitude 111 is derived from the adjacent sampled data amplitudes 110 and 112. Under ordinary clocking (line 44), sample amplitudes 112 and 113 would be used to compute the next data point. However, the next computed data point 114 falls beyond amplitude 113, and thus the amplitude 112 is not employed for calculating this computed data. Rather, amplitudes 114 and 115 are used. This condition demonstrates an overflow from the adder 71 which causes an additional word to be read from the buffer 62. The data resampled actually stored in the memory therefore is derived from two data samples at the most probable value for the computed X-Y location. This eliminates the discontinuity which would be produced between samples 112 and 115 if the raw samples were used directly, without resampling.

In the ultrasound application, other well-known signal processing not illustrated is employed, such as time/gain compensation, log compression, etc. One problem which occurs in the ultrasound application is that the ultrasound beam first converges at the focal length of the transducer and then diverges laterally. In the far field of this beam, small targets appear larger laterally due to the divergence of the beam. In the presently preferred embodiment, unique lateral beam processing is employed to correct for this problem. This processing is implemented within the sample storage buffer 62 of FIG. 2.

Figure 9:
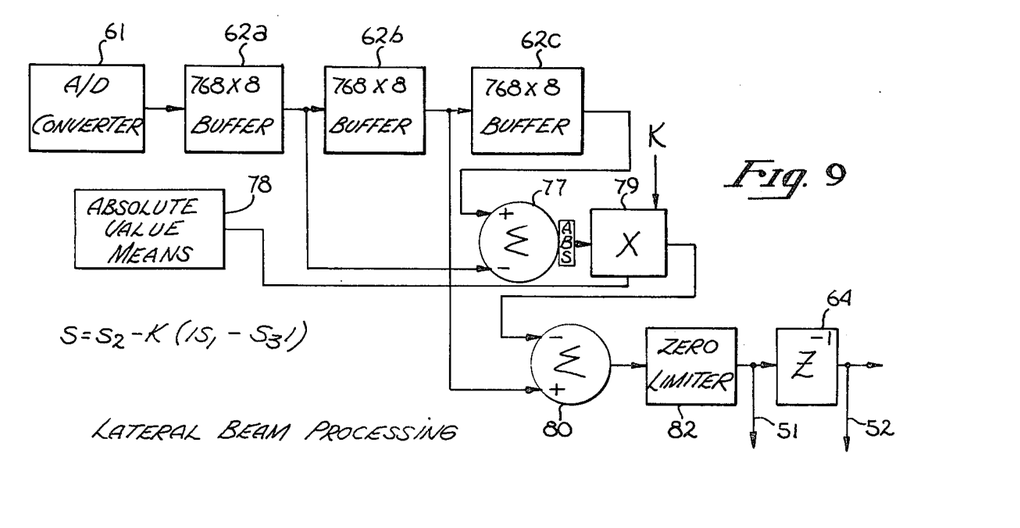
FIG. 9 is a block diagram of the circuit used to provide lateral beam compensation in an ultrasound apparatus.

In the presently preferred embodiment, as shown in FIG. 9, three buffers are employed, each of which has a capacity of 768 8-bit words. These buffers are identified as buffers 62a, 62b and 62c in FIG. 9. The input to the buffer 62a is coupled to the output of converter 61. The output of buffer 62a is subtracted from the output of the buffer 62c by the summing means 77. The absolute value of this difference signal is taken by the absolute value means 78 and multiplied by a factor K within the multiplier 79. The output of the multiplier 79 is subtracted from the output of the buffer 62b within the summer 80.

This output is zero limited by limiter 82, as will be described. The output of limiter 82 is coupled to the buffer 64. The circuitry of FIG. 9 implements the equation $S = S_2 - K(|S_1 - S_3|)$, where $S_1$, $S_2$ and $S_3$ represents the data sensed at three consecutive angles. In effect, this processing sharpens the beam, thereby reducing the effects of the divergence.

The factor K is a function of the number of angles at which data is sensed, that is, the number of beams per revolution. As the angular spacing between the beams ($\Delta\theta$) increases, less correction is necessary and the factor K is reduced. On the other hand, when there are more beams per rotation, the factor K must be larger to achieve the equivalent improvement in apparent beam width, that is, inversely proportional to the angle (in radians) between consecutive beams. Values of K may be empirically determined; in the presently preferred embodiment they vary between 0.5 and 4.0.

As previously implemented, the apparatus employs only positive digital numbers for memory storage. The zero limiter 82 limits the output from the lateral beam processing to a lower limit of 0.

It is apparent that any digital memory array has a finite limitation in the smallest angular divergence of a line pair which it can contain. Also, as the angle between vectors of polar data is increased, gaps of unaddressed picture elements will begin to appear between adjacent vectors. These gaps of missing data represent artifacts in the picture which can seriously impair the perceived information in the display (sometimes referred to as "pixelation"). In the presently preferred embodiment, this problem is solved by selectively replicating data in the memory. In FIG. 4, a number of small blocks are shown with letters A through E. Assume that each of these blocks represents a pixel on a display or a storage location in the RAM 56 of FIG. 1. At the relatively close radius indicated by the block A, the angular spacing does not exceed the width of one pixel. Further along line 102, as indicated by the blocks B, two pixels are required to fill the area between adjacent vectors and thus the data is replicated and stored in two locations. At the radius of blocks C, the same data is stored at three locations. Further along line 102, the data is stored in five locations (blocks D) and five locations (block E). The locations are arranged in a manner so as to store the data in a line generally perpendicular to the beam line (line 102). This is approximated by the interlaced arrangements of the blocks as shown by blocks D and E.

Figure 5:
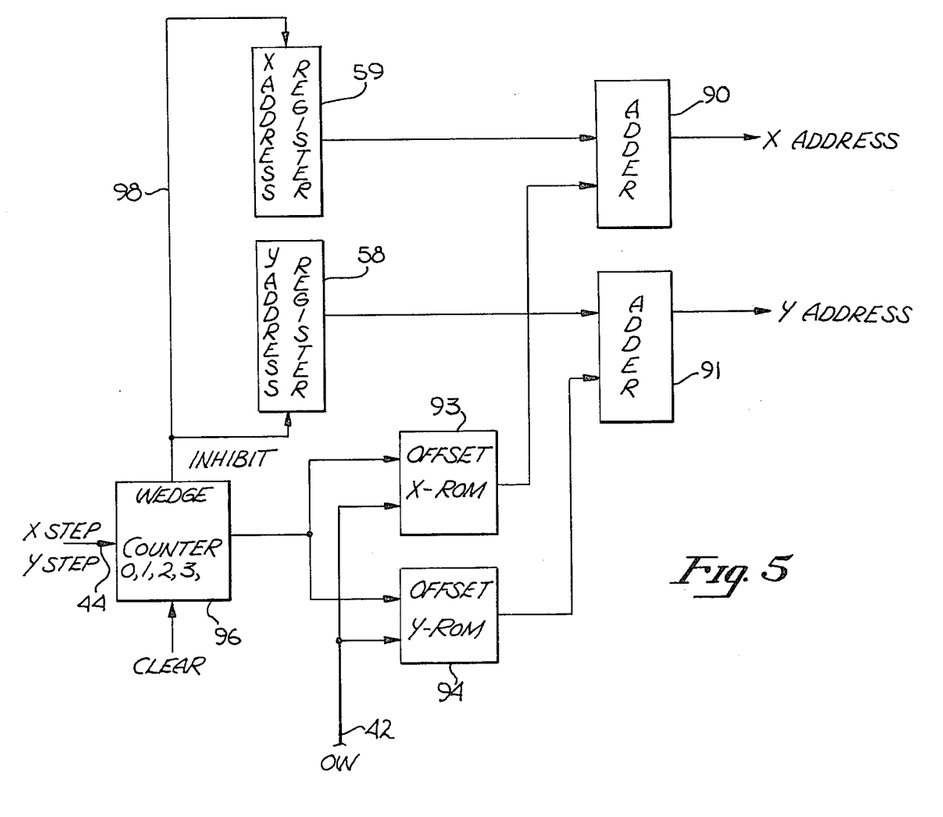
FIG. 5 is a block diagram of the presently preferred embodiment of a circuit employed to "spread" data to provide a uniform display.

The circuit for replicating the data in memory at the appropriate locations is shown in FIG. 5. In effect, this circuit provides a wedge-shaped path within the memory to prevent "holes" in the display. For each angle, the X-step/Y-step signal 44 is coupled to the wedge counter 96. This counter, which is an ordinary digital counter, provides counts of 0, 1, 2, 3, etc. as a function of the accumulated number of X steps or Y steps at each angle. Referring briefly to FIG. 4, at block A, the counter provides no counts; at blocks B, a count of 1; at block C, a count of 2; etc. The counter provides an inhibit signal which is coupled to the X address register 59 and the Y address register 58 on line 98 to prevent the contents of these registers from changing during the time that the wedge counter is counting. An adder 90 is coupled between the X register 58 and the X address input of memory 56. Similarly, an adder 91 is coupled between the Y address register 58 and the Y address input to the memory 56. The output of the wedge counter 96, that is, the counts of 0, 1, 2, 3, etc. are coupled to a read-only memory 93 and a read-only memory 94. These counts are used as addresses along with the octant word, which is also coupled to both of these memories on line 42 and tan $\theta$ coupled to both memories on line 28. (Note the angle $\theta$ could be used instead of tan $\theta$ to form a part of the address.) The output of the ROM 93 is coupled to the adder 90 and the output of the ROM 94 to the adder 91.

In general, the wedge counter inhibits address changes in registers 58 and 59 for the number of counts required to replicate the data, after which one new address is introduced and the process is repeated.

Assume that data at block 115 of FIG. 4 is being coupled to the memory 56 of FIG. 1, and thus the X address register 59 and Y address register 58 contain the address corresponding to the location of this block. The wedge counter, having sensed the total number of X steps or Y steps, provides a count of 2. While this count is provided, the address of block 115 in registers 58 and 59 is retained in these registers by the inhibit signal on line 98. The count along with the octant word on line 42, and tan $\theta$ on line 28, when coupled to the ROM 93, causes the ROM 93 to provide a signal to the adder 90 of +1 and then −1. This provides the required offset to replicate the data of block 115 in the two adjacent locations shown in FIG. 4. Note for this position along line 102, no Y offset is required. Further along line 102, for example, at blocks D and E, the Y-ROM 94 also provides appropriate signals to the adder 91 to provide an offset in the Y direction simultaneously with the offsets in the X direction. This, for example, is required to replicate data at the location of the block 116. As is apparent, the wedge counter 96 is cleared for each new angle at which data is sensed. Note that the circuit for this "wedging" function may be realized in hardware form as shown in FIG. 5 or may be implemeted in software.

The replication of data in this manner may lead to imperfections in the display since data from one point is, in effect, spread to other areas. These imperfections may be minimized by interpolating between lines, in a similar manner to the resampling performed by the interpolator 76 and related circuits of FIG. 2. For example, referring to FIG. 4 and the line 118, rather than replicate the data in block F into location 119, the "F" and "C" data may be interpolated and used for blocks 119 and 120. This interpolation, of course, may be used for all the replicated data. It is relatively easy to implement this interpolation since the necessary data is stored in registers 62a, 62b and 62c of FIG. 9.

Thus a method and apparatus has been described for mapping polar data into Cartesian coordinate form. Specific circuits have also been described which are particularly useful in an ultrasound application, sch as the lateral beam processing discussed in conjunction with FIG. 9.

I claim:

1. An apparatus for mapping data associated with a plurality of angles into a Cartesian coordinate system having a first and a second axis comprising:
   segment indicator means for providing segment signals representative of the segment in which each of said plurality of angles is located;
   trigonometric function means for providing tangent signals representative of the tangent of each of said plurality of angles and secant signals representative of the secant of each of said plurality of angles;
   first differential means for providing locations on said first axis as a function of locations on said second axis, said tangent signals and said segment signals, and also for providing locations on said second axis as a function of locations on said first axis, said tangent signals and said segment signals, said first differential means coupled to sid trigonometric means and said segment indicator means;
   second differential means for controlling selection of said data for each of said locations on said first and second axes as a function of said secant signals, said second differential means coupled to said trigonometric means and coupled to control said selection of said data;
   whereby said data is mapped into a Cartesian coordinate system.

2. The apparatus defined in claim 1 wherein said first differential means includes an adder and a register and where the output of said register is coupled to the input of said adder, said adder input also being coupled to receive said tangent signal.

3. The apparatus defined by claim 1 including an overflow signal means for providing an overflow signal each time the contents of said adder exceeds a predetermined value and wherein said overflow signal is coupled to step said locations along said second axis.

4. The apparatus defined by claim 1 wherein said second differential means includes an adder and a register and where the output of said register is coupled to the input of said adder, said adder intput also being coupled to receive said secant signals.

5. The apparatus defined by claim 4 including an overflow signal means for providing an overflow signal each time the contents of said adder exceeds a predetermined value, said overflow signal being coupled to control the relative rate of sampling of said data.

6. The apparatus defined by claim 5 including interpolation means for providing an interpolated value between two data samples of said data, said interpolation means being coupled to said register.

7. The apparatus defined by claim 1 wherein said trigonometric function means provides exsecant signals, said exsecant being a function of said secant, to said second differential means.

8. The apparatus defined by claim 1 including replication means for replicating said data, said replication means coupled to said first differential means to replicate said data as a function of said locations along said first and second axes.

9. In an ultrasound system which includes at least one rotating transducer which senses ultrasound returns at a plurality of angles ($\theta$), an apparatus for mapping said returns into orthogonal X-Y axes comprising:
   segment indicator means for providing digital signals representative of the segment in which each of said plurality of angles is located;
   trigonometric means for providing digital signals representative of the tangent of each of said plurality of angles;
   an X register for identifying positions along said X axis;
   a Y register for storing signals representative of positions along said Y axis;
   first differential means for controlling the incrementing and decrementing of a selected one of said X and Y registers as a function of the incrementing and decrementing of the other of said X and Y registers and said digital signals representative of said tangent and said digital signals representative of said segment, said first differential means coupled to said trigonometric means, X register and Y register, whereby X and Y locations are determined at said angles.

10. The apparatus defined by claim 9 wherein said trigonometric means provides digital signals representative of the secant of each of said plurality of angles and including a second differential means for controlling the selection of samples of said returns as a function of said digital signals representative of said secant.

11. The apparatus defined by claim 9 wherein said digital signals representative of said segment control said selection of one of said X and Y registers for said incrementing and decrementing.

12. The apparatus defined by claim 11 wherein said digital signals representative of said segment control said incrementing and decrementing of said registers.

13. The apparatus defined by claim 12 wherein said first differential means calculates $X = Y \tan \theta$ and $Y = X \tan \theta$ as a function of said digital signals representative of said segment.

14. A method for converting data sequentially received in time and associated with a plurality of polar angles $\theta$ into a Cartesian coordinate system comprising the steps of:

determining the tangent and secant for each of said polar angles $\theta$;

computing X and Y locations for said data as a function of said tangent and said time; and controlling the selection of data for said locations as a function of said secant and said time;

whereby said data is mapped into Cartesian coordinates.

15. The method defined by claim 14 including the processing of data prior to said selection by computing:

$$S = S_2 - K(|S_1 - S_3|)$$

where S is said processed data and $S_1$, $S_2$, and $S_3$ represent data from three consecutive ones of said plurality of polar angles $\theta$, and where K is inversely proportional to the differences between said consecutive angles.

16. In an apparatus for mapping sensed data (S) associated with a plurality of polar angles, where said sensed data includes distortions caused by lateral divergence of a beam which first converges at the focal length of its source and then diverges laterally thus making small targets beyond said focal length appear larger laterally, a method for compensating for said distortions comprising:

accumulating said sensed data ($S_1$, $S_2$, and $S_3$) for at least three consecutive ones of said polar angles;

performing the computation:

$$S_2 - K(|S_1 - S_3|)$$

where K is a constant for a given set of sensing conditions, whereby compensation is provided for said distortion.

17. The method defined by claim 16 wherein K is inversely proportional to the difference between consecutive polar angles.

18. In an apparatus for mapping data associated with a finite plurality of angles into a Cartesian coordinate system having a first and a second axis, an improvement for compensating for gaps which occur due to angular divergence comprising:

location determining means for determining location of said data along said first and second axes;

replication means for replicating said data in a predetermined manner as a function of said location along said first and second axes, said replication means coupled to said location determining means;

whereby said gaps are correctly filled with replications of said data.

19. The improvement defined by claim 18 wherein said location determining means includes a digital counter for providing predetermined counts as a function of said location along said first and second axes.

* * * * *